3,378,442
COMPOSITIONS FOR PRODUCING ANALGESIA AND ANTIPYRESIS

Bernard Loev, Broomall, and Donald T. Walz, Drexel Hill, Pa., assignors to Smith Kline & French Laboratories, Philadelphia, Pa., a corporation of Pennsylvania
No Drawing. Continuation of application Ser. No. 309,895, Sept. 18, 1963. This application Nov. 13, 1964, Ser. No. 411,091
5 Claims. (Cl. 167—65)

This application is a continuation application of Ser. No. 309,895 filed Sept. 18, 1963, now abandoned.

This invention relates to pharmaceutical compositions having analgesic and antipyretic activity substantially without methemoglobin formation and to methods of producing said activity.

As reported by Goodman and Gilman, The Pharmacological Basis of Therapeutics, 311–316 (second edition, 1955, MacMillan Company) methemoglobin formation is one of the major side effects produced by acetanilide and acetophenetidin. The novel compositions of this invention which contain as the active ingredient an anilide derivative are particularly advantageous in that they produce a separation of the useful analgesic and antipyretic activity from the undesirable methemoglobin formation.

The pharmaceutical compositions according to this invention comprise, in dosage unit form, a pharmaceutical carrier and, as the active ingredient, an anilide having the following formula:

Formula I

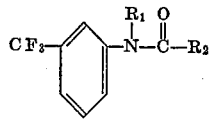

in which:
$R_1$ is hydrogen or lower alkyl, and
$R_2$ is lower alkyl, lower alkenyl, lower alkynyl or cycloalkyl.

Preferred pharmaceutical compositions of this invention contain as the active ingredient a compound of Formula I in which $R_2$ is lower alkyl. An advantageous pharmaceutical composition of this invention contains m-trifluoromethylacetanilide as the active ingredient.

The pharmaceutical compositions of this invention comprise an anilide of Formula I in an amount sufficient to produce analgesia and antipyresis substantially without methemoglobin formation. Preferably the compositions contain from about 50 mg. to about 500 mg. of the active ingredient, advantageously from about 75 mg. to about 300 mg., per dosage unit.

The pharmaceutical carrier employed in the compositions of this invention can be either a nontoxic solid or liquid. Exemplary of solid carriers are lactose, magnesium stearate, terra alba, sucrose, talc, stearic acid, gelatin, agar, pectin, tragacanth and acacia. Exemplary of liquid carriers are peanut oil, olive oil, sesame oil and glycols. Also water and tragacanth or acacia may be used to form suspensions of the active ingredient. The carrier or diluent may include a time delay material such as glyceryl monostearate or glyceryl distearate alone or with a wax.

A wide variety of pharmaceutical forms can be employed and are prepared by methods known to the art. If a solid carrier is used, the composition can be tabletted, used as a pharmaceutical powder, placed in a gelatin capsule or used in the form of a troche or lozenge. If a liquid carrier is used, the composition can be placed in a soft gelatin capsule or in an ampule or used in a liquid suspension.

The method of producing analgesia and antipyresis substantially without methemoglobin formation in accordance with this invention comprises administering internally to animals an anilide of Formula I, preferably with an nontoxic pharmaceutical carrier. The anilide will be administered in an amount sufficient to produce analgesia and antipyresis substantially without methemoglobin formation. The active ingredient will be administered orally or parenterally in dosage units as described above in repeated doses in a daily dosage regimen of from about 50 mg. to about 2000 mg., advantageously from about 100 mg. to about 1500 mg. According to a method of this invention a dosage unit of from about 50 mg. to about 500 mg. of the active ingredient is administered at about two to six times per day. When the administration described above is carried out, analgesia and antipyresis substantially without methemoglobin formation are produced.

The compounds of Formula I which are the active in-invention and are used in the method of this invention are prepared by acylating a m-trifluoromethylaniline or N-lower alkyl-m-trifluoromethylaniline with the appropriate carboxylic acid, acid chloride or acid anhydride.

The term "lower alkyl" where used herein denotes groups having about 1–4 carbon atoms; the terms "lower alkenyl" and "lower alkynyl" denote groups having about 2–4 carbon atoms and the term "cycloalkyl" denotes groups having about 3–6 carbon atoms.

The following examples are not limiting but are illustrative of the invention.

Example 1

| Ingredients: | Amounts (mg.) |
|---|---|
| m-Trifluoromethylacetanilide | 100 |
| Sucrose | 50 |
| Starch | 25 |
| Talc | 5 |
| Stearic acid | 2 |

The active ingredient and the sucrose are mixed and granulated with 10% gelatin solution. The wetted mass is passed through a #6 U.S. mesh screen directly onto drying trays. The granules are then mixed with the starch, talc and stearic acid, passed through a #60 U.S. mesh screen and then compressed into tablets.

Two tablets are administered three time a day.

Example 2

Tablets are made as described in Example 1 using as the active ingredient m-trifluoromethylpropionanilide (500 mg.) and m-trifluoromethylvaleranilide (250 mg.).

Example 3

A mixture of 4.0 g. of m-trifluoromethylaniline and 3.5 g. of methyl iodide in ethanol is heated at reflux for two hours. The mixture is cooled and treated with an excess of sodium carbonate solution. Concentrating and filtering gives N-methyl-m-trifluoromethylaniline.

To a solution of 3.5 g. of N-methyl-m-trifluoromethylaniline in 10 ml. of glacial acetic acid is added 2.2 g. of acetic anhydride. The resulting mixture is refluxed for 30 minutes. After cooling, pouring the mixture into ice water, filtering and recrystallizing from aqueous ethanol, N-methyl-m-trifluoromethylacetanilide is obtained.

Similarly reacting m-trifluoromethylaniline with an equivalent amount of n-butyl bromide gives N-(n-butyl)-m-trifluoromethylaniline. Acetylating as described above gives N-(n-butyl)-m-trifluoromethylacetanilide.

Example 4

A mixture of 16.1 g. of m-trifluoromethylaniline and 20 ml. of acrylic acid is heated at reflux for two hours. Cooling, pouring into water, filtering and recrystallizing from aqueous ethanol gives m-trifluoromethylacrylanilide.

Similarly refluxing m-trifluoromethylaniline with crotonic acid and propiolic acid gives m-trifluoromethylcrotonanilide and m-trifluoromethylpropiolanilide, respectively.

Example 5

A mixture of 16.1 g. of m-trifluoromethylaniline and 14.8 g. of cyclohexanecarboxylic acid chloride in ethanol is heated at reflux for two hours. The mixture is cooled and poured into ice water. Filtering and recrystallizing from aqueous ethanol gives m-trifluoromethylcyclohexanecarboxyanilide.

Similarly using cyclopropanecarboxylic acid chloride and cyclopentanecarboxylic acid chloride the products are m-trifluoromethylcyclopropanecarboxyanilide and m-trifluoromethylcyclopentanecarboxyanilide, respectively.

Example 6

Ingredients: Amounts (gm.)
N-methyl-m-trifluoromethylacetanilide _____ 200
Lactose _____ 100

The ingredients are screened through a #40 U.S. mesh screen, transferred to a mixer, mixed well and filled into a hard gelatin capsule.

Example 7

Ingredients: Amounts (gm.)
m-Trifluoromethylcrotonanilide _____ 250
Peanut oil _____ 150

The ingredients are mixed into a thick slurry and filled into a soft gelatin capsule.

Example 8

Ingredients: Amounts (gm.)
m-Trifluoromethylcyclohexanecarboxyanilide ___ 50
Lactose _____ 75

The ingredients are mixed and filled into a hard gelatin capsule.

What is claimed is:

1. A dosage unit in the form of a tablet, capsule, troche, lozenge or ampule for internal administration having analgesic and antipyretic activity substantially without methemoglobin formation comprising a pharmaceutical carrier combined with from about 50–500 mg. of a compound selected from the group consisting of an anilide of the formula:

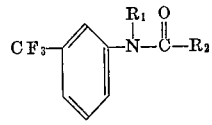

in which:

$R_1$ is a member selected from the group consisting of hydrogen and lower alkyl, and $R_2$ is a member selected from the group consisting of lower alkyl, lower alkenyl having 2–4 carbon atoms, lower alkynyl having 2–4 carbon atoms and cycloalkyl having 3–6 carbon atoms.

2. A dosage unit in the form of a tablet, capsule, troche, lozenge or ampule for internal administration having analgesic and antipyretic activity substantially without methemoglobin formation comprising a pharmaceutical carrier combined with from about 50–500 mg. of m-trifluoromethylacetanilide.

3. A dosage unit in accordance with claim 1 characterized in that said dosage unit is a tablet.

4. A dosage unit in accordance with claim 1 characterized in that said dosage unit is a capsule.

5. A dosage unit in the form of a tablet, capsule, troche, lozenge or ampule for internal administration having analgesic and antipyretic activity substantially without methemoglobin formation comprising a pharmaceutical carrier combined with from about 50–500 mg. of a compound selected from the group consisting of an anilide of the formula:

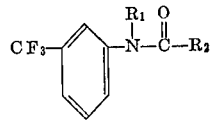

in which:

$R_1$ is a member selected from the group consisting of hydrogen and lower alkyl, and $R_2$ is lower alkyl.

References Cited

FOREIGN PATENTS 452,436  8/1936  Great Britain.

ALBERT T. MEYERS, *Primary Examiner.*

JULIAN S. LEVITT, *Examiner.*

S. FRIEDMAN, *Assistant Examiner.*